MAGNETIC TAPE SIGNAL TRANSFER COMPENSATION SYSTEM

Filed Jan. 3, 1963

*INVENTOR.*
Daniel Cronin
*BY*
S. C. Yuter
ATTORNEY

United States Patent Office 3,300,590

Patented Jan. 24, 1967

3,300,590
MAGNETIC TAPE SIGNAL TRANSFER COMPENSATION SYSTEM

Daniel Cronin, 345 W. 58th St., New York, N.Y. 10019

Filed Jan. 3, 1963, Ser. No. 249,208
9 Claims. (Cl. 179—100.2)

This invention pertains to signal transfer compensation systems and more particularly to systems which compensate for the nonlinear magnetic transfer characteristic of magnetic record media by means of predistortion of the recording signal.

In many signal transfer systems there is at least one stage whose transfer characteristic is nonlinear. For example, in a magnetic recording system the magnetic record medium or magnetic tape has a nonlinear flux density retained versus magnetization applied characteristic as is hereinafter more fully described. Accordingly, in a magnetic recording system regardless of the linearity of all the recording or reproducing amplifiers, there will be generally present nonlinear distortion between the signals which are recorded and the reproduced signals. This distortion usually increases with increasing signal amplitude. Such nonlinearity imposes a series limitation on the available signal-to-noise ratio, or distortion, or both, in high quality magnetic recording systems.

Magnetic tape manufacturers have recognized this limitation and haxe expended considerable time and money in trying to produce what is called high output magnetic tape. While such tape has somewhat extended the linear range of magnetic recording, it has not completely eliminated nonlinear distortion, nor has it permitted recording at the desired high amplitudes.

Some people have suggested solving the problem by accepting the nonlinear transfer characteristic of the magnetic tape and purposely distorting the reproduced signals of the recording in a compensating manner. Such a solution, called postdistortion, cannot adequately solve the problem because when one attempts to play back a tape which has been stored in a tape library for some time (which may be up to several years) the operator may not be aware of the precise formulation of magnetic oxide or oxides in the tape. The various manufacturers change this from time to time in the continuing effort to improve the signal-to-noise ratio and the distortion characteristics of the tape. Without this knowledge, the operator has no idea of the remanent flux density which corresponds to the onset of the knee of the transfer characteristic (as is hereinafter more fully described) nor does he known the rate-of-change of the slope of remanent flux density with respect to magnetization force as the magnetization force increases above the knee. Thus in the general case where an operator does not have full information concerning the flux density versus magnetization force curve of a previously made tape recording, he is not in a position to know the exact specifications for providing a postdistortion compensation curve.

Another problem is postdistortion as opposed to predistortion is caused by the fact that the usual playback head is not flux responsive, but produces an output voltage proportional to the rate of change of flux. The distortion which is attempted to be eliminated is not at all related to the rate of change of flux, but is closely proportional to the flux density. Thus it appears that playback equalizers creating a voltage waveform which is a replica of the original flux must precede the postdistorter. While such equalizers are normally present in the tape playback amplifier, any small errors in the correspondence between the ideal and actual response of these equalizers will cause a failure of complete distortion cancellation which may well be more serious than the relatively small error in frequency response which gave rise to it.

Similarly, it is found that there is the possibility of errors in azimuth of the playback head and minute accumulations of dirt on the face of the playback head which will introduce moderately small errors in frequency response which in turn may produce rather serious errors in the accuracy of distortion cancellation.

Since the above problems either do not exist at all, or else exist only to a much smaller degree in a predistorting system, such a system is to be preferred. In particular, predistortion does not have nearly as great a problem in this regard since a high quality tape recorder is normally adjusted to use one specific type of magnetic tape, and when a change occurs or is desired in the magnetic tape type, the predistortion circuit is merely readjusted in the same manner that the various other recording parameters must be readjusted. (Typically these will include bias level, record equalization, record calibration, bias calibration and playback level.)

Heretofore, attempts have been made to compensate for the nonlinear distortion introduced by the magnetic record medium by employing a predistortion amplifier having a transfer characteristic which complements the entire remanent flux density versus magnetization force characteristic of the magnetic tap. However, as hereinafter explained more fully, this characteristic is nonlinear at both low and high amplitudes of magnetization force. While these attempts have been somewhat successful for the high amplitudes they have not been successful in compensating for the nonlinearity in the low amplitude regions.

Accordingly, a general object of the invention is to provide an improved signal transfer compensation system.

Another general object of the invention is to provide an improved signal transfer system giving a substantially linear signal transfer in spite of the fact that one component of the system includes an inherently nonlinear transfer characteristic.

It is another object of the invention to provide an improved magnetic recording system wherein means are provided to compensate for the nonlinear magnetic transfer characteristic of the magnetic record medium.

It is a further object of the invention to provide an improved magnetic recording system wherein improved predistortion amplifier means are included to compensate for the nonlinear magnetic transfer characteristic of the magnetic record medium.

It is also an object of a feature of the invention to provide an improved predistortion signal amplifier which includes nonlinear signal responsive elements which control the signal amplification of the amplifier.

It is a further object of the invention to satisfy the above objects with aparatus which is on the one hand highly reliable while on the other hand is relatively simple and inexpensive.

Briefly, in accordance with the invention a linear magnetic recording system is provided which includes a signal source, a magnetic recording head, a magnetic record medium movable past the magnetic recording head, with a predistortion signal amplifier coupling the signal source to the magnetic recording head. The magnetic recording medium has a flux density versus magnetization force that is nonlinear in a first direction for amplitudes of magnetization force less than a first amplitude linear for magnetization forces greater than the first amplitude and less than a second amplitude and nonlinear in a second direction for magnetization forces greater than the second amplitude. An alternating-current high-frequency bias is applied to the magnetic recording head to linearize the nonlinearity in the first direction. The predistortion signal amplifier has a transfer characteristic which is only nonlinear in the first direction to compensate for the nonlinearity in the second direction in the transfer characteristic of the magnetic record medium.

A feature of the invention is a predistortion amplifier which includes negative feedback elements cooperating with nonlinear signal responsive elements which decrease the negative feedback with increase in signal amplitude.

Other objects, features and advantages of the invention will be apparent from the following detailed description of the invention when read with the accompanying drawings wherein.

Figures 1, 2, 3, 4, 5:
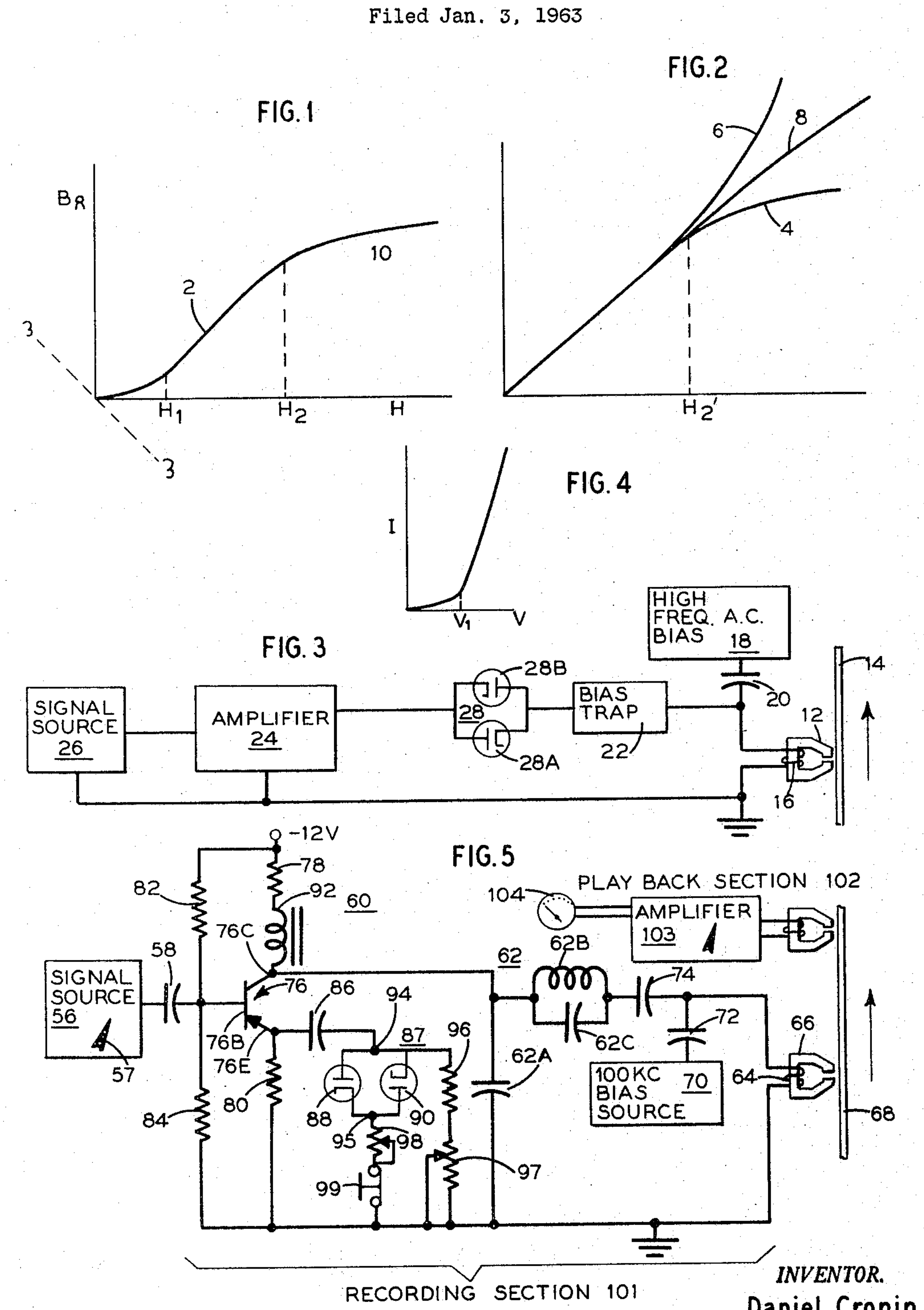
FIGURE 1 shows the usual magnetic transfer characteristic of magnetic recording tape.
FIGURE 2 shows transfer characteristics for the same magnetic recording tape, but with the superposition of a high frequency bias in accordance with one aspect of the invention.
FIGURE 3 is a block schematic representation of a system in accordance with an exemplary embodiment of the invention.
FIGURE 4 shows the current versus voltage characteristic of a nonlinear element such as a diode employed in the system of FIGURE 3.
FIGURE 5 is a schematic diagram of a preferred embodiment of the invention included in a magnetic tape recorder system.

Referring to FIGURE 1, there is shown a magnetic transfer characteristic of a magnetic recording medium, such as a conventional magnetic tape. For the sake of simplicity, only the curve 2 representing the characteristic in the first quadrant is shown. However, it should be realized that the characteristic is symmetrical with respect to the line 3—3 of FIGURE 1. The abscissa measures the units of magnetization force H, while the ordinate represents units of flux density retained B.

When a magnetic recording medium is subjected to a magnetization force H, corresponding flux density B is set up in the recording medium. There are generally three regions to the curve. One region starting at substantially zero magnetization force and continuing to the magnetization force $H_1$ is called the instep region of the transfer characteristic. Within this region large changes in magnetization force H cause only slight changes in flux density. In other words, the characteristic is nonlinear in a first direction or the rate of change of the slope is positive. In the region from $H_1$ to $H_2$, the transfer characteristic is substantially linear, wherein equal increments of change in the magnetization force H produce equal increments of change in the flux density B. Beyond the region $H_2$, generally called the knee of the transfer characteristic, the saturation effects of the recording medium come into play and a smaller increase in flux density B is produced for increases in magnetization force H. In other words, the characteristic is nonlinear in a second direction or the rate of change of the slope is negative.

It should be noted that the removal of the magnetization force H will not cause complete loss of the flux density B. Instead, some of the flux density B will remain or is retained by the recording medium and is somewhat less than the flux density B present in the recording medium while being subject to a predetermined magnetization force. This retained flux density may be expressed as $B_r$, that is, the remanent flux density. It is actually this remanent flux density that permits a magnetic recording to be remembered by the magnetic record medium. The remanent flux density $B_r$, or more exactly the rate-of-change of remanent flux density is the quantity read back during a reproducing operation. Since the remanent flux density $B_r$ is somewhat less than the actual flux density, FIGURE 1 shows substantially the shape of the magnetic transfer characteristic representing the retained flux density $B_r$ versus the magnetization force H. As can be seen from this curve, there is an inherent nonlinearity in the transfer characteristic of the magnetic recording medium. Consequently, whenever the magnetic recording medium is an element in an overall magnetic recording system the overall transfer characteristic of the magnetic recording system will be nonlinear, no matter how linear the transfer characteristics of the remaining elements may be. Therefore, in order to provide a truly linear system, it is necessary to, in effect, linearize the magnetic transfer characteristic.

As a first step in this linearization, FIGURE 2 shows a magnetic transfer characteristic 4, i.e., retained flux density versus magnetization force for the first quadrant only. There is the same symmetry as in FIGURE 1. It will be noted that nonlinearity occurs only in the region beyond $H_2'$. More particularly the nonlinearity of the instep region has been removed. This is accomplished by superimposing on the conventional magnetization force H a high-frequency alternating-current bias magnetization force, as is hereinafter more fully described. Although there has been some linearization, the transfer characteristic 4 still is nonlinear with respect to the higher amplitudes of the magnetization force, because the alternating-current bias greatly linearizes the instep region it has little or no effect on the knee region. However, if the magnetization force increases in amplitude at a rate depicted by the curve 6 and such a magnetization force is applied to the magnetic record medium, then the normal nonlinear transfer will be compensated and the overall effect will be a new magnetic transfer characteristic which is nonlinear only for values of magnetization force much greater than the magnetization force $H_2'$. Accordingly, the same magnetic record medium can be used with higher level signals before the distortion sets in.

FIGURE 3 shows an exemplary embodiment of the invention. The magnetic record medium 14 moves past the magnetic recording head 12 For the sake of simplicity it can be assumed that the magnetization force applied to the magnetic recording medium 14 by the magnetic recording head 12 is directly proportional to the current in the winding 16. Therefore, to obtain the linearity for small amplitudes of magnetization force, a high-frequency alternating-current bias signal is fed from the high-frequency alternating-current bias source 18 via the capacitor 20 to the winding 16. Bias trap 22 is provided solely to prevent the leakage of high-frequency alternating-current biasing signal back to the remainder of the circuit. Amplifier 24 and diode network 28 provide a means having a signal transfer characteristic which is complementary to the magnetic transfer characteristic 4 of FIGURE 2. In particular, these elements, that is amplifier 24 and diode network 28, have a transfer characteristic similar to that shown by the curve 6 which is the complement of curve 4 of FIGURE 2.

Amplifier 24 is a conventional signal amplifier. The actual complementary nonlinearizing is performed by the diode network 28. Each of the diodes 28A and 28B has a current versus applied voltage characteristic as shown in FIGURE 4. In particular, it is seen in FIGURE 4 that as the forward or conduction voltage applied to the diode increases beyond a given voltage $V_1$, the resistance of the diode decreases. It should be noted that the resistance of the diode for any voltage is the inverse of the slope of the characteristic at that point. Accordingly, it is apparent that as the magnitude of the signal from amplifier 24 increases, the voltage across the conducting diode increases and the resistance of that diode is first substantially constant and then decreases. Only one of the diodes 28 conducts at a time. Diode 28A conducts for positive going signals and diodes 28B for negative going signals. With decrease in resistance of the conducting diode, more current can flow from amplifier 24 to the winding 16 of the magnetic recording head. Consequently, the nonlinear increase of current with magnitude of signal causes a nonlinear increase in the magnetization force. This nonlinear increase in magnetization force is in the opposite direction for the change in slope of the magnetic transfer characteristic 4 of FIGURE 2 and consequently the overall effect is to provide a transfer characteristic from amplifier 24 to the magnetic recording medium 14 which is shown as the line 8 of FIGURE 2. Accordingly, signals fed from signal source 26 via amplifier 24 and diode network 28 are recorded on magnetic record medium 14 as a remanent flux density $B_r$ that linearly represents the signal from signal source 26.

While the embodiment shown in FIGURE 3 may be used in some applications, it is difficult to match the curve of signal voltage to the diode characteristic at more than one frequency because of the variation of the impedance of winding 16 of the magnetic head with frequency. FIGURE 5 shows a system in accordance with the preferred embodiment of the invention which does not have this limitation. The embodiment of FIGURE 5 employs a negative feedback arrangement that includes non-linear elements which cause a decrease in the magnitude of the negative feedback with increasing signal amplitude. The nonlinear elements are chosen so that their resistance versus applied voltage characteristic has a slope which is the complement of the slope of the remanent flux density versus magnetization force curve. In other words, these curves have a shape or slope relationship which is the same as the relationship of curves 4 and 6 of FIGURE 2. It should be noted that curves may differ in scale but do not have the indicated shape relationship. Such a relationship wherein two curves are mirror images of each other except for a scale factor will be called a complementary relationship.

In the system of FIGURE 5, signal source 56 is coupled via capacitor 58 to a predistortion signal amplifier 60. The output of predistortion signal amplifier 60 has a transfer characteristic similar to the transfer characteristic 6 shown in FIGURE 2. In any event, the signal passes via the bias trap 62 to the winding 64 of magnetic recording head 66 for recording on the magnetic record medium 68 which moves past the magnetic recording head 66. The one hundred kilocycle bias source 70 feeds a high-frequency alternating current via capacitor 72 to the winding 64 of the magnetic recording head 66 to provide the low amplitude linearization as hereinbefore described. Wave trap 62 includes the shunt capacitor 62A and the parallel combination of inductor 62B and capacitor 62C. Capacitor 74 is used solely as a direct current blocking capacitor to prevent direct current from entering the head winding 64.

The predistortion signal amplifier 60 comprises the transistor 76 acting as a signal amplifier. The transistor 76 includes an emitter 76E, a base 76B and a collector 76C. The transistor 76 is connected in a common emitter configuration; that is, the emitter is the common terminal with the base 76B being the input terminal and the collector 76C the output terminal. Operating bias is supplied to the base 76B by the series connected resistors 82 and 84 which act as a voltage divider between the source of potential $-12$ v. and ground. An operating potential is supplied to the collector 76C by virtue of the series-connected resistor 78 and inductor 92 which provide a source of current from the source of potential $-12$ v. to the collector 76C. A degeneration resistor 80 couples the emitter 76E to ground. In other words, the degeneration resistor 80 provides a negative feedback for the common emitter amplifier.

Under normal operating conditions, as the signal fed to the base 76B becomes more negative, the increase in current flow through the degeneration resistor 80 causes the potential of the emitter 76E to become more negative so that a negative feedback signal is applied to the amplifier. However, as the amplitude of the signal on the emitter 76E increases in response to an increase in the amplitude of the signal fed to the base 76B, the signal on the emitter 76E is fed via blocking capacitor 86 to the junction 94. This signal is applied across the non-linear element 87 which comprises diodes 88 and 90 connected in parallel and in oppositely conducting arrangement between junctions 94 and 95 with a potentiometer 98 connecting junction 95 to ground via switch 99. In particular, the cathode of diode 88 and the anode of diode 90 are connected to junction 95; and the cathode of diode 90 and the anode of diode 88 are connected to junction 95. Included in nonlinear element 87 is the serial combination of resistor 96 and potentiometer 97.

The role of potentiometers 97 and 98 and resistor 96 is to facilitate curve shaping as is hereinafter more fully described. In other words, these elements are employed to insure that the resistance versus applied voltage characteristic of nonlinear element 87 is the complement of the remanent flux density versus magnetization force curve under the influence of a high-frequency alternating-current bias if the diodes 80 and 90 per se do not have such a complementary curve. If the diodes 88 and 90 per se have such a characteristic, junction 95 is grounded and resistor 96 and potentiometer 97 are not present. If the diodes 88 and 90 do not have this characteristic, potentiometers 97 and 98 are adjusted so that the nonlinear element 87 does have the characteristic.

In any event if the increase in emitter signal amplitude is in a positive-going direction, diode 88 conducts more heavily and when the knee of the characteristic is reached, resistance decreases (see FIGURE 4). If, on the other hand, the amplitude of the signal at the junction 94 increases in the opposite direction with respect to a zero condition, diode 90 conducts more heavily and its resistance starts decreasing after the knee of its characteristic is reached. In either case, an increase in the signal amplitude at the base 76B is transferred as an increase in signal amplitude at the emitter 76E and the resistance of one of the diodes 88 and 90 (which are connected signalwise in parallel with the degeneration resistor 80) decreases. Therefore, the resistance of the parallel combination of degeneration resistor 80 and either of the conducting diodes 88 or 90 decreases. In effect, the negative feedback decreases with increasing signal amplitudes. Because of this decrease in degenerative feedback, the transfer characteristic of the predistortion amplifier 60 takes the form shown in curve 6 of FIGURE 2.

Figure 6:
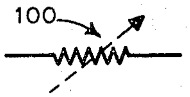
FIGURE 6 shows a varistor employed in accordance with another embodiment of the invention.

It should be noted that the diodes 88 and 90 can be replaced by a circuit device having a similar characteristic such as a varistor. Accordingly, varistor 100 of FIGURE 6 may be connected across terminals 94 and 95 of FIGURE 5 in place of diodes 88 and 90. Likewise, thyrites or even Zener diodes with adjustable series resistors may be so employed.

In accordance with the general object of the invention it is desirable to reduce nonlinear distortion over the widest possible range of frequencies of the input signal. This requires that the relationship of signal current flowing through winding 64 of magnetic recording head 66 to the signal current flowing between emitter 76B and ground be the same at all signal frequencies. To achieve this, inductor 92 and resistor 78 are chosen to be in the same ratio as the inherent inductance and resistance of the wire of winding 64.

A method of curve fitting will now be described with respect to the system of FIGURE 5 which shows a simplified high-quality professional type magnetic tape recorder that includes a recording section 101 and a playback or reproducing section 102, each with its own magnetic recording head. The magnetic tape is driven in the direction indicated by the arrow by a drive mechanism (not shown).

Initially, a standard test tape is mounted on the recorder with the recording section 101 deactivated and the playback section 102 activated. The standard test tape (such as Ampex Test Tape Number 31311–05) has recorded thereon a signal of such a magnitude that there will only be a one percent distortion due to the nonlinearity of the tape beyond the knee of the characteristic. While this tape is being played, the gain of amplifier 103 of the playback section 102 is adjusted until the conventional volume unit meter 104 coupled to amplifier 103 shows a reading of −6, i.e. minus 6 db. The standard tape is then replaced by a tape of the type which will normally be used by the recorder. This tape is now driven past both heads and a one kilocycle signal is generated by signal source 56 for recording thereon. The gain of signal source 56 is adjusted by gain control knob 57 until the volume unit meter 104 reads ±0; i.e. zero db. In other words, the recording is now six db above the standard operating level and would under uncompensated conditions indicate a three percent nonlinear distortion. The push button 99 is then depressed, removing the nonlinear element 87 from the circuit. If the diodes 88 and 90 are operating at knee (see FIGURE 4) the volume unit meter 104 will show −0.8; i.e. a drop of 0.8 db. If this is not the case, potentiometer 97 is adjusted until this occurs. Then the knee of the diode curve coincides with the knee of the magnetic tape characteristic.

Generally, this adjustment is all that is required. In some cases it may be necessary to adjust the slope of the diode curve beyond its knee to the slope of the magnetic tape characteristic beyond its knee. In such a case, the signal gain of the signal source 56 is increased until the volume unit meter 104 shows a reading of plus 3 db. When button 99 is now depressed the volume unit meter 104 should read +1; i.e. plus 1 db. If it doesn't, potentiometer 98 is adjusted until such a reading is obtained. There may be some interaction between the two adjustments so that he adjusments may have to be repeated once or twice for optimum adjustment.

For the recording section 101 shown in FIGURE 5 having components (hereinafter indicated in Table 2) the following Table 1 indicates the values of resistor 90 and the actual incircuit resistances of potentiometers 97 and 98 for present commercially available high quality magnetic recording tape.

*Table 1*

| Tape Type | Incircuit Resistance, Potentiometer 97 (ohms) | Incircuit Resistance, Potentiometer 98 (ohms) |
|---|---|---|
| Audio devices | 35 | 170 |
| MMM–131 | 30 | 160 |
| MMM–111 | 30 | 160 |
| MMM–120 | 20 | 60 |

It should be noted that MMM designates the Minnesota Mining and Manufacturing Company magnetic tapes.

The following Table 2 values of the various components of the system of FIGURE 5 are given by way of illustration only.

*Table 2*

| | |
|---|---|
| Transistor **76** | 2N527. |
| Magnetic head **66** | 3 millihenrys; 75 ohms. |
| Resistor **78** | 200 ohms. |
| Resistor **80** | 82 ohms. |
| Resistor **82** | 5600 ohms. |
| Resistor **84** | 1500 ohms. |
| Resistor **96** | 56 ohms. |
| Inductor **62B** | 1 millihenry. |
| Inductor **92** | 8 millihenrys. |
| Diode **88** | 1N56. |
| Diode **90** | 1N56. |
| Capacitor **58** | .10 microfarad. |
| Capacitor **62A** | .01 microfarad. |
| Capacitor **62C** | .001 microfarad. |
| Capacitor **72** | .01 microfarad. |
| Capacitor **74** | 100 microfarads. |
| Capacitor **86** | 200 microfarads. |
| Potentiometer **97** | 0 to 100 ohms. |
| Potentiometer **98** | 0 to 250 ohms. |

Although only a few embodiments of the invention have been shown and described in detail there will now be obvious to those skilled in the art many modifications and variations which do not depart from the spirit of the invention as defined in the claims which follow.

What is claimed is:

1. A linear magnetic recording system comprising: a source of signals; a magnetic recording head adapted for operation with a magnetic record medium movable past said magnetic recording head, said magnetic record medium having a flux density versus magnetization force applied characteristic which is nonlinear in a first direction for amplitudes of magnetization force below a first amplitude, linear for amplitudes of magnetization force from said first amplitude to a second and greater amplitude and nonlinear in a second and opposite direction for amplitudes greater than said second amplitude; an alternating-current high-frequency biasing source connected to said magnetic recording head to remove the nonlinearity in said first direction; and a predistortion signal amplifier for coupling said source of signals to said magnetic recording head, said predistortion signal amplifier having a nonlinear transfer characteristic in said first direction for compensation for the nonlinearity in said second direction in the characteristic of said magnetic record medium.

2. A linear magnetic recording system comprising: a source of signals; a magnetic recording head adapted for operation with a magnetic record medium movable past said magnetic recording head, said magnetic record medium having a flux density versus magnetization force applied characteristic which is nonlinear in a first direction for amplitudes of magnetization force below a first amplitude, linear for amplitudes of magnetization force from said first amplitude to a second and greater amplitude and nonlinear in a second and opposite direction for amplitudes greater than said second amplitude; an alternating-current high-frequency biasing source connected to said magnetic recording head to remove the nonlinearity in said first direction; and a negative feedback signal amplifier for coupling said source of signals to said magnetic recording head, said negative signal amplifier having feedback characteristic which is linear for signals up to a given amplitude and which decreases nonlinearly for signals greater than said given amplitude for compensation for the nonlinearity in said second direction in the characteristic of said magnetic record medium.

3. A linear magnetic recording system comprising: a magnetic recording head including input means; a magnetic record medium movable past said magnetic recording head, said magnetic record medium having a flux density retained versus magnetization force characteristic which is nonlinear; a signal source including an output means; a predistortion signal amplifier means having a compensating signal transfer characteristic for connecting said signal source to said magnetic recording head, said predistortion signal amplifier means including a signal amplifier having a signal input terminal, a signal output terminal and a common terminal, means for connecting said signal input terminal to the output means of said signal source, means for applying operating potentials to said terminals, and degenerative feedback signal means connected to said signal amplifier, said degenerative feedback signal means having a characteristic wherein the magnitude of the negative feedback decreases as the signal applied to said degenerative feedback signal means increases beyond a given value to lessen the negative feedback effect of said degenerative feedback signal means and accordingly increasing the signal amplification of said predistortion signal amplifier means, an alternating-current high-frequency biasing source, and means for connecting said alternating-current high-frequency biasing source to said magnetic recording head.

4. A linear magnetic recording system comprising: a magnetic recording head including input means; a magnetic record medium movable past said magnetic recording head, said magnetic record medium having a flux density retained versus magnetization applied characteristic which is nonlinear; a signal source including an output means; a predistortion signal amplifier having a compensating signal transfer characteristic for connecting said signal source to said magnetic recording head, said predistortion signal amplifier including a transistor having an emitter, a collector and a base, a signal input means for connecting said base to the output means of said signal source, means for applying an operating bias to said base, a degeneration resistor having first and second ends, means for connecting said first end to said emitter, means for applying operating potentials to said collector and said second end of said degeneration resistor, means for connecting said transistor to said input means of said magnetic recording head, a nonlinear resistance means having a characteristic wherein the resistance decreases as the voltage across said nonlinear resistance means increases beyond a given value, means for connecting said nonlinear resistance means in parallel with said degeneration resistor so that as the magnitude of the voltage of said emitter increases in response to the increase in the magnitude of the signal received at said base the resistance of said nonlinear resistance means in parallel with said degeneration resistor decreases to lessen the negative feedback effect of said degeneration resistor and accordingly increasing the signal amplification of said predistortion signal amplifier; an alternating-current high-frequency biasing source; and means for connecting said alternating-current high-frequency biasing source to the input means of said magnetic recording head.

5. The system of claim 4 wherein the nonlinear resistance means has a resistance versus voltage characteristic which is complementary to the flux density retained versus magnetization applied characteristic beyond the knee of said characteristic.

6. The system of claim 5 wherein the nonlinear resistance means includes diodes.

7. The system of claim 5 wherein the nonlinear resistance means includes a varistor.

8. A linear magnetic recording system comprising: a magnetic recording head including first and second input terminals; a magnetic record medium movable past said magnetic recording head, said magnetic record medium having a flux density retained versus magnetization applied characteristic which is nonlinear; a signal source including an output means; a predistortion signal amplifier having a compensating signal transfer characteristic for connecting said signal source to said magnetic recording head, said predistortion signal amplifier including a transistor having an emitter, a collector and a base, input means for connecting said base to the output means of said signal source, means for applying an operating bias to said base, a degeneration resistor having first and second ends, means for connecting said first end to said emitter, a source of operating potentials, means for connecting said source of operating potentials to said collector, means for connecting said source of operating potentials to said second end of said degeneration resistor, means for connecting said collector to said first input terminal of said magnetic recording head, means for connecting said second input terminal of said magnetic recording head to said second end of said degeneration resistor, first and second diodes each including an anode and a cathode, each of said diodes having a characteristic wherein the resistance of each of said diodes, while conducting, decreases as the voltage across said diodes increases beyond a given value, a first junction means for connecting the anode of said first diode to the cathode of said second diode, a second junction means for connecting the cathode of said first diode to the anode of said second diode, a blocking capacitor for connecting said first junction to one end of said degeneration resistor, means for connecting said second junction to the other end of said degeneration resistor whereby said diodes are connected signalwise, in parallel with said degeneration resistor so that as the amplitude of the voltage of said emitter increases in response to the increase in the amplitude of the signal received at said base the conduction resistance of one of said diodes in parallel with said degeneration resistor decreases to lessen the negative feedback effect of said degeneration resistor and accordingly increasing the signal amplification of said predistortion signal amplifier; an alternating-current high-frequency biasing source; and means for connecting said alternating-current high-frequency biasing source to one of said input terminals of said magnetic recording head.

9. The linear magnetic recording system of claim 8 wherein said magnetic recording head has an impedance and said means for connecting the collector to the source of operating potentials includes a resistance and inductance whereby the ratio of the impedance of said means and the impedance of said magnetic recording head is maintained substantially constant over the frequency range of signals from said signal source.

References Cited by the Examiner

Burstein, H., and Pollak, H. C.: Elements of Tape Recorder Circuits, Gernsback Library, Inc., New York, New York, 1957, pp. 93–146.

TERRELL W. FEARS, *Acting Primary Examiner.*

A. I. NEUSTADT, *Examiner.*